(12) United States Patent
Rustomji et al.

(10) Patent No.: US 12,080,851 B1
(45) Date of Patent: Sep. 3, 2024

(54) ELECTROLYTE CHEMICAL FORMULATIONS FOR ENERGY STORAGE DEVICES

(71) Applicant: SOUTH 8 TECHNOLOGIES, INC., San Diego, CA (US)

(72) Inventors: Cyrus S. Rustomji, San Diego, CA (US); Jungwoo Lee, San Diego, CA (US); Frederick Krause, Carlsbad, CA (US); Jeremy Intrator, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/597,828

(22) Filed: Mar. 6, 2024

Related U.S. Application Data

(60) Provisional application No. 63/450,745, filed on Mar. 8, 2023.

(51) Int. Cl.
  *H01M 10/00* (2006.01)
  *H01M 10/0569* (2010.01)

(52) U.S. Cl.
  CPC .......... *H01M 10/0569* (2013.01); *H01M 2300/0037* (2013.01)

(58) Field of Classification Search
  CPC .......... H01M 10/052; H01M 10/056; H01M 10/0561; H01M 10/0564; H01M 10/0566; H01M 10/0567; H01M 10/0568; H01M 10/0569
  See application file for complete search history.

(56) References Cited

U.S. PATENT DOCUMENTS

| | | |
|---|---|---|
| 2019/0337933 A1 | 11/2019 | Bulinski |
| 2020/0067130 A1 | 2/2020 | Rustomji et al. |
| 2020/0230370 A1 | 7/2020 | Golzar et al. |
| 2023/0024358 A1* | 1/2023 | Kim .............. H01M 4/625 |

FOREIGN PATENT DOCUMENTS

| | | | |
|---|---|---|---|
| CN | 115441059 A | * | 12/2022 |
| WO | 2017204984 | | 11/2017 |

OTHER PUBLICATIONS

Qu et al., Multifunctional Electrolyte For Lithium Metal Battery And Lithium Metal Battery, Dec. 2022, See the Abstract. (Year: 2022).*
ISR for PCT/US2024/018746 dated Jun. 10, 2024 (10 pages).

* cited by examiner

*Primary Examiner* — Cynthia H Kelly
*Assistant Examiner* — Monique M Wills
(74) *Attorney, Agent, or Firm* — Manuel de la Cerra

(57) ABSTRACT

The present invention discloses ionically conducting electrolytes that include a liquefied gas solvent displaying low global warming potential (GWP) and low flammability while also generating favorable solid-electrolyte interphases in an electrochemical device to maintain high performance and cycle life. Ionically conducting electrolytes include a multi-component solvent mixture with a low-GWP solvent and non-low GWP solvent. The overall GWP of the multi-component solvent mixture is at least 50% less than the GWP of the non-low GWP solvent alone.

11 Claims, 6 Drawing Sheets

$R_{1-4}$= F, Cl, H $R_{1-6}$= F, Cl, H $R_{1-8}$= F, Cl, H

ELECTROLYTE CHEMICAL FORMULATIONS FOR ENERGY STORAGE DEVICES

CROSS-REFERENCE TO RELATED APPLICATIONS

This application claims priority to U.S. Application 63/450,745 filed on Mar. 8, 2023, the entire contents of which are incorporated herein by reference.

This application is also related to the following applications and patents, each of which is hereby incorporated by reference in their entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued on Aug. 10, 2021; U.S. Pat. No. 10,873,070 issued on Dec. 22, 2020; U.S. Pat. No. 11,342,615 issued on May 24, 2022; PCT/US20/26086 filed on Apr. 1, 2020; PCT/US22/31594 filed on May 31, 2022; PCT/US23/11864 filed on Jan. 30, 2023; PCT/US23/17720 filed on Apr. 6, 2023; PCT/US23/28104 filed on Jul. 19, 2023; PCT/US23/28105 filed on Jul. 19, 2023; PCT/US23/35766 filed on Oct. 24, 2023; PCT/US24/16784 filed on Feb. 21, 2023; U.S. Application 63/418,703 filed on Oct. 24, 2022; U.S. Application 63/461,252 filed on Apr. 22, 2023; U.S. Application 63/461,387 filed on Apr. 24, 2023; U.S. Application 63/470,174 filed on May 31, 2023; and U.S. Application 63/534,213 filed on Aug. 22, 2023.

FIELD OF THE INVENTION

This invention relates to chemical formulations of electrolytes for energy storage devices.

BACKGROUND OF THE INVENTION

Typical electrolytes for lithium-ion batteries and related technologies consist of flammable liquid solvents. Liquid electrolytes often limit the performance of battery cells in terms of temperature operation, power, energy, cycle life, and safety.

Another class of electrolytes is the liquefied gas electrolyte, in which the primary solvents are normally in the gas phase under standard temperature and pressure, but may be liquefied under a moderate pressure and mixed with salts to form into conducting electrolytes. The liquefied gas electrolytes may be utilized in energy storage devices such as batteries or capacitors to give superior temperature, power, energy, and/or safety performance.

The liquefied gas electrolytes may be comprised of solvents having moderate to high global warming potential (GWP), which is a measure of a molecule's contribution to global warming through its radiative forcing relative to carbon dioxide as a standard. For example, if the GWP of $CO_2$ is defined as 1, fluoromethane has a GWP of 92, and difluoromethane has a GWP of 675. It would be beneficial to utilize liquefied gas solvents displaying low or no effective GWP while maintaining other beneficial properties desired in an ideal electrolyte solvent, beneficial properties such as high polarity, chemical stability, non-toxicity, and low cost. Further, it has been shown that some of these high GWP and flammable liquefied gas solvents can form into optimal solid-electrolyte interphases (SEI) for effective cell operation.

It would be beneficial to identify other liquefied gas solvents displaying low GWP and low flammability while also generating favorable solid-electrolyte interphases in a battery device to maintain high performance and cycle life.

SUMMARY OF THE INVENTION

Disclosed herein is an ionically conducting electrolyte that includes a salt and a liquefied gas solvent mixture having a vapor pressure above 100 kPa at a temperature of 293.15 K. This mixture is made up of a first solvent component and a second solvent component. The first solvent component may have a GWP of less than 10, while the second component may have a GWP of greater than 80. By mixing this multi-component solvent that includes a low-GWP component and a non-low GWP component, the overall GWP of the ionically conducting electrolyte may be reduced. The relative amounts of the first solvent component and the second solvent component may preferably be selected to reduce the GWP of the liquefied gas solvent mixture by less than 10% of the GWP of the second solvent component, more preferably by 50% of the GWP of the second solvent component, and even more preferably by 70% of the GWP of the second solvent component.

Examples of the first solvent component may include: hydrochloroolefins, hydrochlorofluoroolefins, perchloroolefins, and perfluoroolefins, 1,1-dichloroethene, vinyl chloride, trichloroethene, dichloroethene, chlorofluoroethene, (Z)-1-chloro-2,3,3,3,-tetrafluoro-propene, trans-1-chloro-3,3,3-trifluoropropene and isomers thereof.

Examples of the second solvent component include: dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, isomers thereof, and a combination thereof.

The salt may be based on lithium, sodium, zinc, calcium, magnesium, aluminum, or titanium.

An electrochemical device may be constructed with the ionically conducting electrolyte. That device may include a housing, an anode, a cathode, and a separator layer in contact with the ionically conducting electrolyte.

Additional aspects, alternatives and variations as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1:
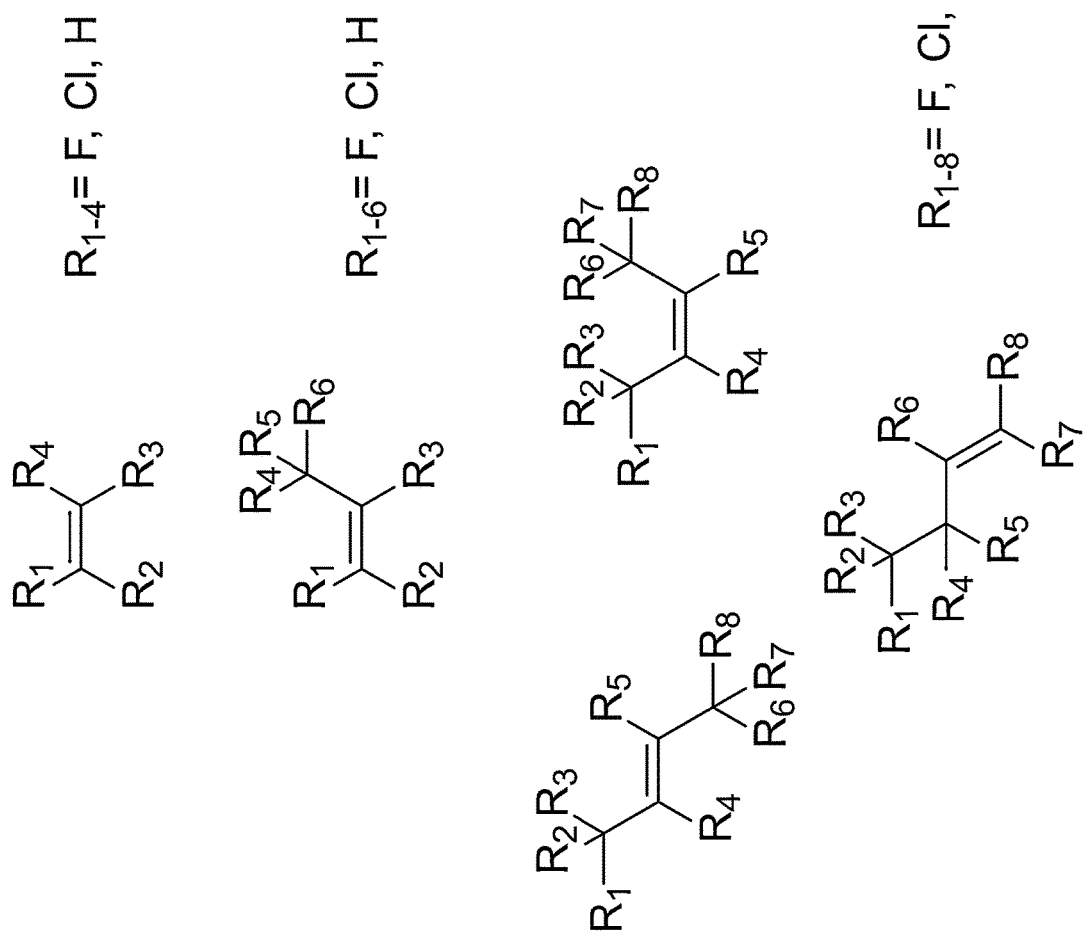
FIG. 1 illustrates molecular structures of olefin molecules having 2, 3 or 4 carbons and hydrogen, chlorine, and or fluorine as atomic constituents of the molecular structure.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments.

Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Electrochemical Device 5
Positive Electrode/Cathode 10
Separator 15
Negative Electrode/Anode 20
Positive Terminal 25
Negative Terminal 30
Housing 35
Electrolyte 40

It would be beneficial to utilize liquefied gas solvents that have a low or no effective global warming potential (GWP<10) while maintaining other beneficial properties desired in an ideal solvent such as the beneficial properties of high polarity, chemical stability, non-toxicity, low cost, and low flammability while enabling formation of solid-electrolyte interphases on electrodes with optimal properties. Mixing moderate or high-GWP solvents with low or zero GWP solvents will lower the overall GWP of the entire solvent composition. However, not all chemicals possess the ideal properties needed to create high-performance electrolytes.

While there are numerous zero- or low-GWP gaseous solvents, not all possess high enough polarity to maintain effective charge separation of conductive salts within an electrolyte mixture to maintain high electrolyte conductivity or to avoid phase separation within the electrolyte mixture. Examples of such low-GWP gaseous solvents with low polarity include hydrocarbons such as methane, ethane, propane, and butane.

Further, many gaseous solvents do not possess the ideal properties or chemical makeup to form ideal SEI layers, thus requiring continual use of high-GWP solvents in electrolyte mixtures which may also be costly, flammable, and exhibit other undesirable characteristics.

Examples of low or zero-GWP solvents, which would give beneficial charge separation properties, increase electrolyte conductivity, limit phase separation, and provide good SEI layers include 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluoroethene, (Z)-1-chloro-2,3,3,3,-tetrafluoropropene, trans-1-chloro-3,3,3-trifluoropropene, 3,3,4,4-pentafluoro-1-butene, and isomers thereof.

It has been shown that mixtures of these low-GWP solvents can lower the GWP of otherwise high-(or non-low) GWP electrolyte formulations (GWP>80). This would improve the environmental impact of the overall mixture. Table 1 shows several examples of this. Where the use of difluoromethane as a solvent shows a high GWP of 677 per kg, a mixture of Difluoromethane: 1,1-Difluoroethylene (1:3) would reduce this GWP to 90 per kg, or about an 85% reduction from difluoromethane alone. In another example, fluoromethane alone has a GWP of 116, but when mixed 2,3,3,3-Tetrafluoropropene in a one-to-one molar ratio, the GWP is lowered by more than 75% to 27. Preferably the lower GWP solvent component will reduce the overall GWP of the liquified gas solvent by at least 10%, more preferably by 50%, and even more preferably by 70%, compared to the GWP of the other (higher GWP) solvent component in the mixture. Other benefits can also include lower vapor pressure, lower cost, extended cycle life, and improved binding energy to the electrolyte cation.

TABLE 1

| Solvent Mixture (molar ratio) | GWP/kg of Solvent Mixture |
|---|---|
| Carbon Dioxide | 1 |
| Fluoromethane | 116 |
| Difluoromethane | 677 |
| trans-1-Chloro-3,3,3-trifluoropropene | 4 |
| trans-1,3,3,3-Tetrafluoropropene | <1 |
| 2,3,3,3-Tetrafluoropropene | <1 |
| 1,1-Dichloroethylene | <1 |
| Fluoromethane: Difluoromethane (1:1) | 445 |
| Fluoromethane: 2,3,3,3-Tetrafluoropropene (1:1) | 27 |
| Fluoromethane: trans-1,3,3,3-Tetrafluoropropene (1:3) | 11 |
| Difluoromethane: 1,1-Difluoroethylene (1:3) | 90 |
| Fluoromethane: Difluoromethane: 2,3,3,3-Tetrafluoropropene (1:1:1) | 92 |

These solvents fall into one of several broader classes of related compounds, including hydrofluoroolefins (HFOs), hydrochloroolefins (HCOs), hydrochlorofluoroolefins (HCFOs), perfluoroolefins (PFOs), or perchloroolefins (PCOs), which are unsaturated organic compounds composed of hydrogen, carbon, fluorine, and/or chlorine. Disclosed herein is the use of these hydrofluoroolefins, hydrochloroolefins, hydrochlorofluoroolefins, and/or perfluoroolefins as components of liquefied gas electrolytes. These solvents can show beneficial performance inside the battery cell and may be gaseous (having a vapor pressure above 100 kPa at a temperature of 293.15 K) or liquid under standard conditions (having a vapor pressure below or equal to 100 kPa at a temperature of 293.15 K).

Further compounds that may be beneficial for electrolyte and electrochemical cell performance are shown in FIG. 1; a general molecular structure having an ethene, propene, or butadiene structure with either a H, F, or Cl atom where R1-R8 is indicated on the structure.

These hydrofluoroolefins, hydrochloroolefins, hydrochlorofluoroolefins, perchloroolefins, or perfluoroolefins may be combined with other liquefied gas solvents to create a complete solvent mixture and, when combined with various salts and additives, can create a complete liquefied gas electrolyte.

Examples of other liquefied gas solvents that may be mixed with these components include dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, isomers thereof, and a combination thereof.

In some embodiments, lithium-, sodium-, zinc-, calcium-, magnesium-, aluminum-, or titanium-based salts are used. Further, electrolyte or solvent solution containing one or more liquefied gas solvents may be combined with one or more salts, including one or more of lithium bis(trifluoromethanesulfonyl)imide (LiTFSI), lithium hexafluorophosphate ($LiPF_6$), lithium perchlorate ($LiClO_4$), lithium hexafluoroarsenate ($LiAsF_6$), lithium tetrachloroaluminate ($LiAlCl_4$), lithium tetragaliumaluminate, lithium bis(oxalato)borate (LiBOB), lithium hexafluorostannate ($LiSnF_4$), lithium difluoro(oxalato)borate (LiDFOB), lithium bis(fluorosulfonyl)imide (LiFSI), lithium aluminum fluoride ($LiAlF_3$), lithium nitrate ($LiNO_3$), lithium trifluoromethanesulfonate, lithium tetrafluoroborate ($LiBF_4$), lithium difluorophosphate, lithium tetrafluoro(oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, dilithium squarate, lithium croconate dihydrate, dilithium rhodizonate, dilithium ketomalonate, lithium diketosuccinate or any corresponding salts with a positively charged sodium or magnesium cation substituted for the lithium cation, or any combinations thereof. Further useful salts include those with positively charged cations such as tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N-(2-methoxyethyl)ammonium, N,N-Diethyl-N-methyl-N-propylammonium, N,N-dimethyl-N-ethyl-N-(3-methoxypropyl)ammonium, N,N-Dimethyl-N-ethyl-N-benzylammonium, N,N-Dimethyl-N-ethyl-N-phenylethylammonium, N-Ethyl-N,N-dimethyl-N-(2-methoxyethyl) ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl)pyrrolidinium, 1-Methyl-1-(3-methoxypropyl)pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato)borate, bis(trifluoromethanesulfonyl)imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate. Alternative or additional embodiments described herein provide an electrolyte composition comprising one or more of the features of the foregoing description or of any description elsewhere herein.

Figure 2:
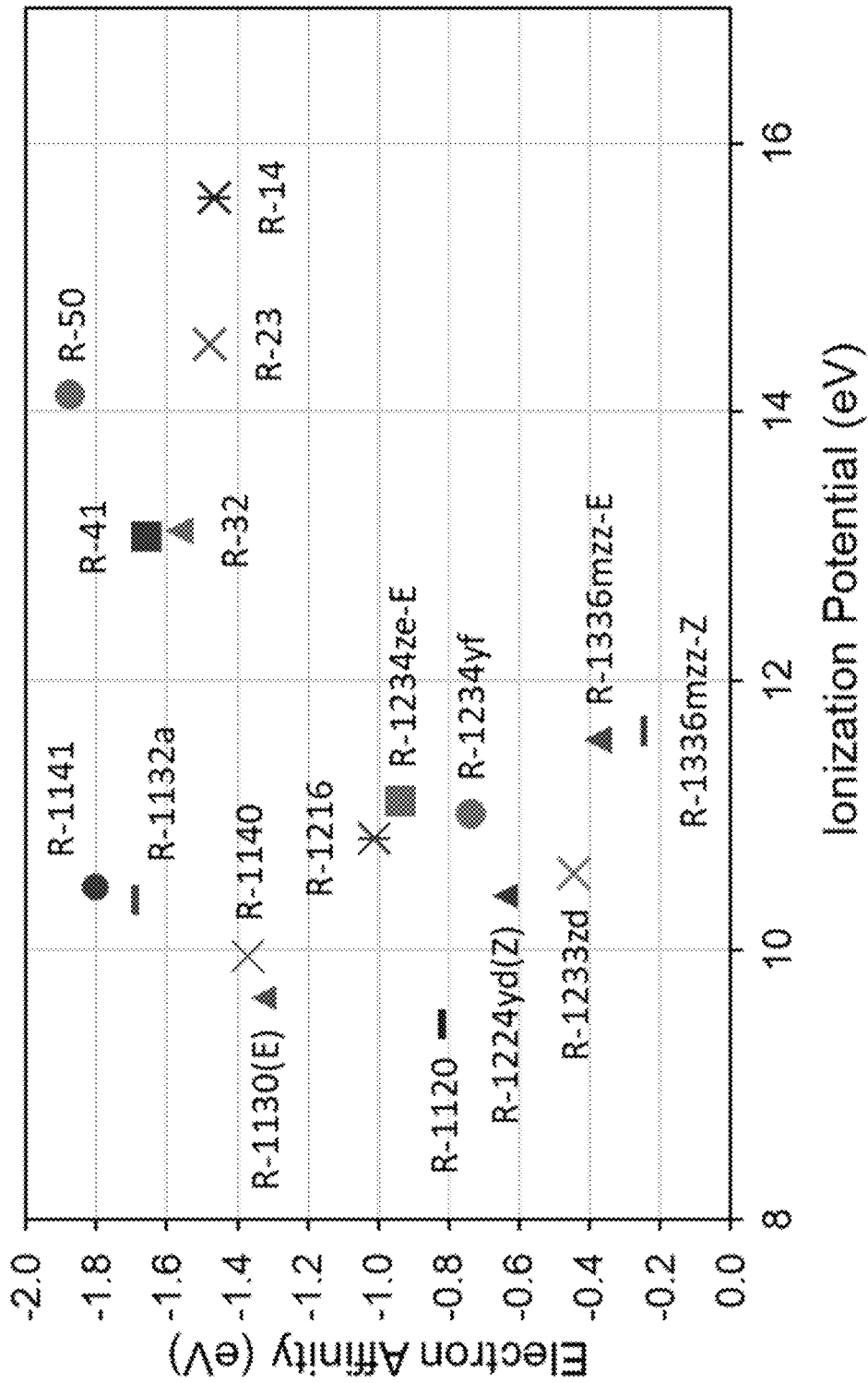
FIG. 2 is a graphical representation of density functional theory calculations that compute the ionization potential and electron affinity of molecules (calculated to the 6-31+G**/B3LYP level of theory).

To determine if a molecule has sufficient stability to be used as a solvent, or has lesser stability and is better used as a sacrificial additive to create ideal solid electrolyte interphases, density functional theory (DFT) may be used. FIG. 2 shows DFT calculations for a variety of molecules (calculated to the 6-31+G**/B3LYP level of theory). Some example molecules are listed in Table 2 with both their ASHRAE and chemical nomenclature.

TABLE 2

| ASHRAE Nomenclature | Chemical Name |
| --- | --- |
| R-50 | Methane |
| R-41 | Methyl Fluoride |
| R-32 | Difluoromethane |
| R-23 | Trifluoromethane |
| R-14 | Tetrafluoromethane |
| R-1141 | Vinyl Fluoride |
| R-1132a | 1,1-Difluoroethene |
| R-1130(E) | trans-1,2-Dichloroethene |
| R-1140 | Vinyl Chloride |
| R-1216 | Hexafluoropropene |
| R-1234ze-E | trans-1,3,3,3,-Tetrafluoropropene |
| R-1234yf | 2,3,3,3,-Tetrafluoropropene |
| R-1120 | Trichloroethene |
| R-1224yd(Z) | (Z)-1-Chloro-2,3,3,3-tetrafluoropropene |
| R-1233zd(E) | trans-1-Chloro-3,3,3-trifluoropropene |
| R-1336mzz-E | trans-1, 1,1,4,4,4,-Hexafluoro-2-butene |
| R1336mzz-Z | cis-1,1,1,4,4,4,-Hexafluoro-2-butene |

Molecules with a more positive ionization potential are more stable against oxidation, and molecules with a more negative electron affinity are more stable against reduction. Using this modeling, it has been determined that molecules such as R-1130(E) are relatively stable against reduction, while, on the other hand, they are relatively unstable against oxidation compared to similarly modeled refrigerants. Thus, this molecule would be useful in the targeted creation of a solid-electrolyte interphase on the cathode. This is because the molecule would not be reduced or decomposed on the anode surface in a battery system, but at high voltages on the cathode, the molecule may be oxidized and may decompose into various chemicals that are deposited on the cathode surface. This surface layer would protect the electrolyte from further oxidation, thus promoting longer cycle life of the battery cell. Other molecules may be similarly determined to have better or poorer oxidative or reductive stability.

Figure 3:
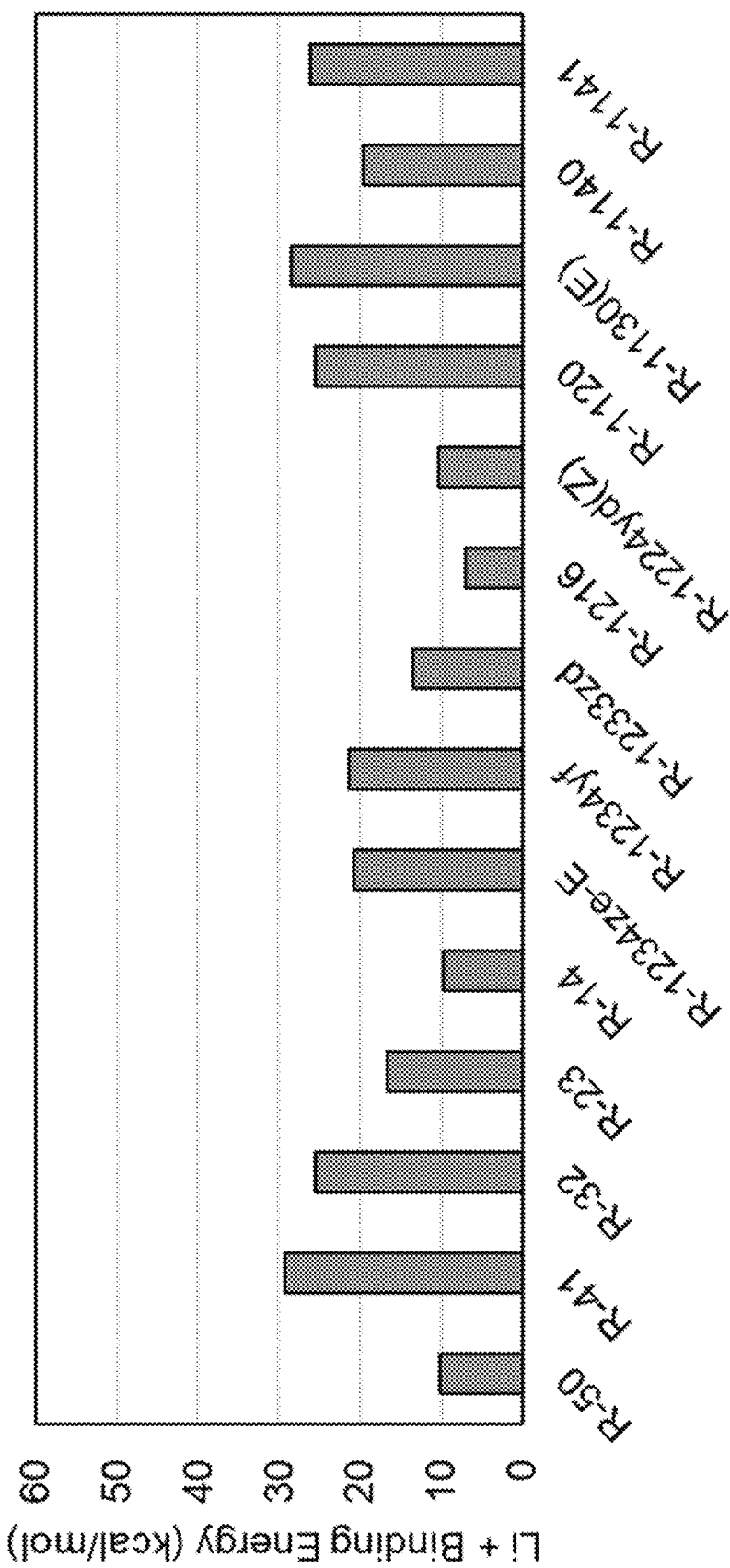
FIG. 3 is a graphical representation of density functional theory calculations that compute the binding energy of molecules to a lithium cation (calculated to the 6-31+G**/B3LYP level of theory).

The binding energy of molecules to the lithium cation was also calculated through DFT. It was calculated that several of the compounds shown in FIG. 3 bind well to the lithium cation. This would promote salt solubility and solvated separation of the anion and cation, leading to higher conductivity and better battery performance. Thus, some ideal fluorinated, chlorinated, or fluorinated and chlorinated olefins would serve as ideal solvents in an electrochemical battery cell electrolyte.

Figures 4A, 4B:
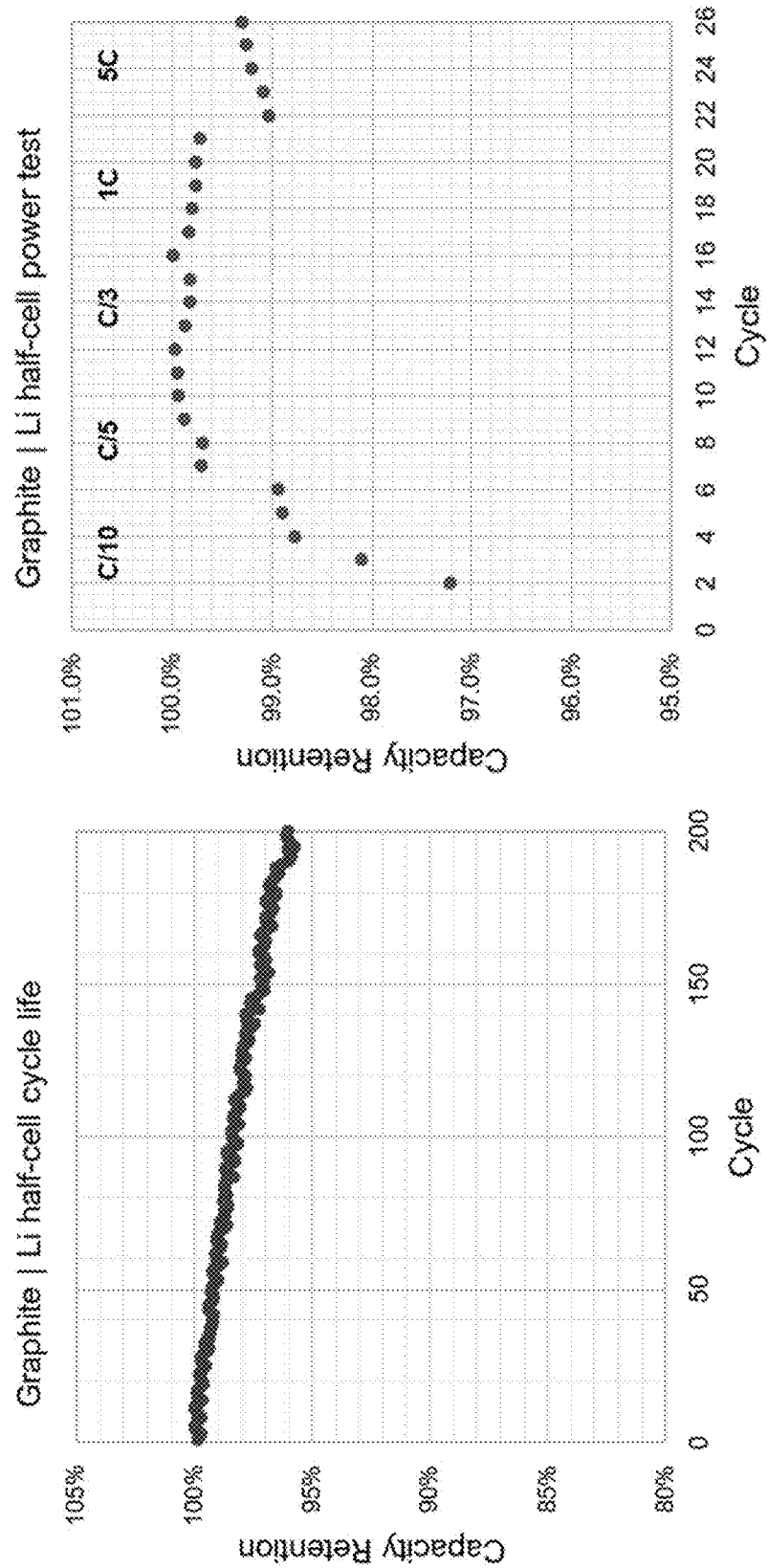
FIGS. 4A and 4B are graphical representations of the capacity retention and rate testing of a graphite anode half-cell using an electrolyte composed of 1M LiTFSI, 2M FEC in 45:45:10 MeF:ClM:CO2.

It has been shown that both LiF and LiCl can act as beneficial solid electrolyte interphase components. These components are electrically resistive, ionically conductive, and insoluble in electrolyte solvents, ideal properties for batteries' solid-electrolyte interphase. FIGS. 4A and 4B show the use of a liquefied gas electrolyte comprised of 1M LiTFSI, 2M FEC in MeF:ClM:CO2 45:45:10 on a graphite anode half-cell. It is shown the cell has good cycle life and power performance, demonstrating high capability for this electrolyte mixture. The mixture of both a chlorinated and fluorinated component is thought to provide for an ideal SEI layer and provides good cell performance such as cycle life as shown on both the anode and cathode. The decomposition products of MeF and MeCl on the anode include LiF and LiCl. The good cyclability of this cell shows that LiCl can act as a good SEI former. It would be ideal to also find molecules that can generate both LiF and LiCl simultaneously upon decomposition. Molecules such as 2,3,3,3-tetrafluoro-1-chloropropene would promote such an SEI composition. These molecules can also have other beneficial aspects, such as lower vapor pressure, lower flammability, lower cost, and lower GWP. Thus, an ideal SEI layer can be formed using molecules single comprising at least one fluorine, at least one chlorine atom, or at least one chlorine and fluorine atom.

Figure 5A:
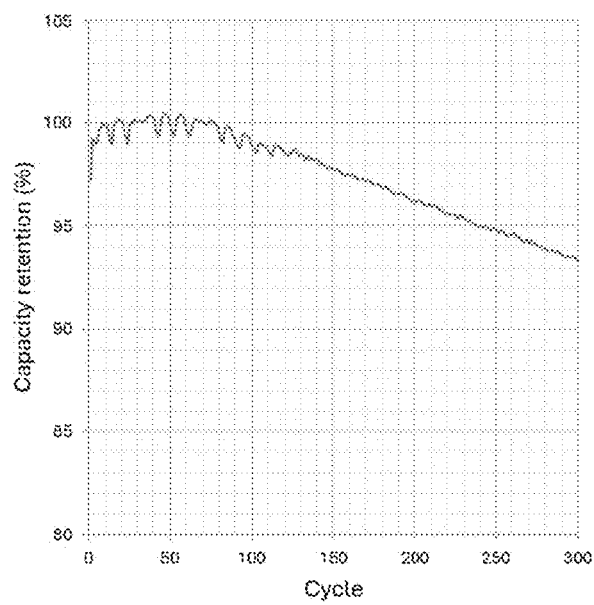
FIG. 5A is a graphical representation of the capacity retention of a 2.7 Ah cell comprising a graphite anode and an NMC811 cathode having a liquefied gas electrolyte comprised of 1.0 M LiFSI, 2.0 M DMC in DFE:FM:CO2:TFP 35:35:10:20 (molar ratio).
Figure 5B:
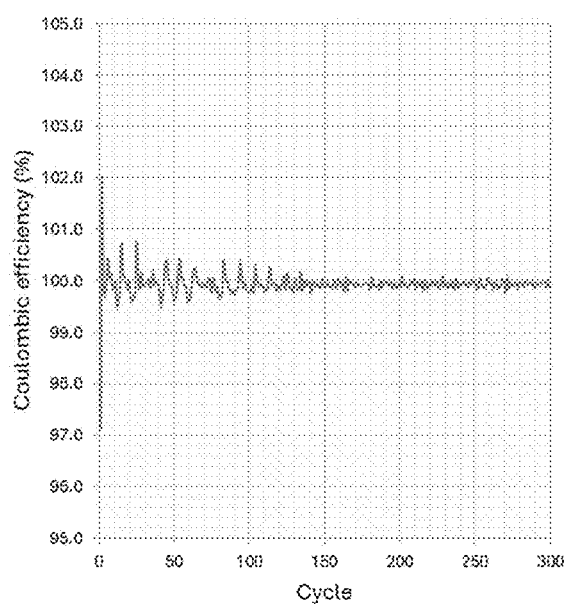
FIG. 5B is a graphical representation of the impedance growth of a 2.7 Ah cell comprising a graphite anode and an NMC811 cathode having a liquefied gas electrolyte comprised of 1.0 M LiFSI, 2.0 M DMC in DFE:FM:CO2:TFP 35:35:10:20 (molar ratio).
Figure 5C:
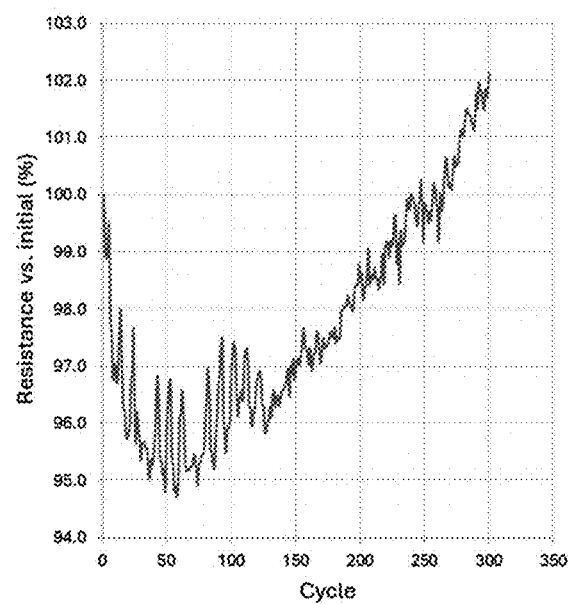
FIG. 5C is a graphical representation of the coulombic efficiency of a 2.7 Ah cell comprising a graphite anode and an NMC811 cathode having a liquefied gas electrolyte comprised of 1.0 M LiFSI, 2.0 M DMC in DFE:FM:CO2:TFP 35:35:10:20 (molar ratio).

FIGS. 5A-5C present data from a compound from FIG. 1, R-1234ze (1,3,3,3-tetrafluoropropene), being used as a component of the liquefied gas electrolyte. This electrolyte used a mixture of 1.0 M LiFSI, 2.0 M DMC in DFE:FM:CO2: TFP 35:35:10:20 (molar ratio) as the full electrolyte solution. It is shown that the electrolyte performs well during cycle life testing, with minimal increase in resistance, high coulombic efficiency, and low drop in capacity. Thus, this low pressure, low cost, low-GWP molecule can be used in an electrochemical cell and shows such a hydrofluoroolefin with at least one fluorine atom can be used to successfully form SEI layers and allow for stable cycling of a battery cell with improved performance. The cycling stability of this cell, as well as the properties of TFP computed by DFT, are both consistent with the formation of a stable SEI.

Previous disclosures showing the use of hydrofluoroolefins as a potential candidate for use in liquefied gas electrolytes do not discuss that a robust SEI layer formation can be achieved through the decomposition of solvent compounds that contain both F and Cl moieties, as indicated in FIG. 1. Similarly, it was not appreciated that hydrochloroolefins can form ideal SEI layer including LiCl instead of LiF. This discovery that these components can decompose to create ideal SEI layers, and that they can also be selected based on calculated oxidation or reduction resistance for targeted solid-electrolyte interphase formation at the cathode or anode, is an important discovery disclosed here. Previously, there would have been no need to determine both the oxidation resistance and the reduction resistance of these molecules, as they were not used for electrochemical applications. Similarly, it was discovered that several of these molecules offer good binding to the lithium cation, contributing positively to an electrolyte's high conductivity and superior battery performance.

Further, previous disclosures did not appreciate that olefin type molecules could form ideal SEI layers due to the unsaturated carbon bond. There are numerous molecules that might be added to electrolyte formulations with similarly unsaturated carbon bonds, but these often do not function well in a battery cell. The olefin type molecules are unique in that they can allow for polymer formation upon decomposition with a high number of fluorine or chlorine constituents (up to 8 in the molecules presented in FIG. 1). The mixture of a flexible polymer, allowing the SEI to be flexible and account for electrode volume change, with inorganic LiF or LiCl constituents leading to a highly electrically-insulating SEI allows for higher-performing and longer cycle-life cells.

The present inventors also unexpectedly found, through experimentation with several iterations of formulations, that molecules containing a chlorinated component (as opposed to a fluorinated component) showed substantially improved solubility in various electrolyte mixtures, not only at room temperature, but notably at higher temperatures. This can be understood in part due to the lower vapor pressure of these formulations, allowing them to remain in a liquid phase under more moderate pressures due to the higher interaction energy between the molecules and the salt within the electrolyte. The pressure of these molecules will be reduced for every fluorine atom that is replaced by a chlorine atom. This also lowers the critical point of these molecules and electrolyte systems. The lower pressure and lower critical point allow for less burden on the mechanical packaging, making the cell lower in mass and lower in cost. Further the electrolyte is easier to handle and process.

The present inventors also unexpectedly found that these compositions form azeotropic mixtures more easily, allowing the vapor and liquid phases to remain with the same percent composition throughout the handling of the electrolyte during electrolyte mixing, electrolyte injection, and battery operation—again lowering manufacturing costs and improving cell efficiency. An example is 1M LiTFSI, 2M FEC in R-1336mzz(Z): 1130(E) in a 75:25 ratio, which forms an azeotropic mixture. This mixture has a low flammability rating due to the chlorinated molecule 1130(E) and a lower GWP. The safety and environmental improvements with these chlorinated molecules are extremely valuable in the energy storage industry and are of immense importance. Their discovery and use in liquefied gas electrolytes are unquestionably of high importance to deliver higher-performance, lower-cost cells to the market.

Figure 6:
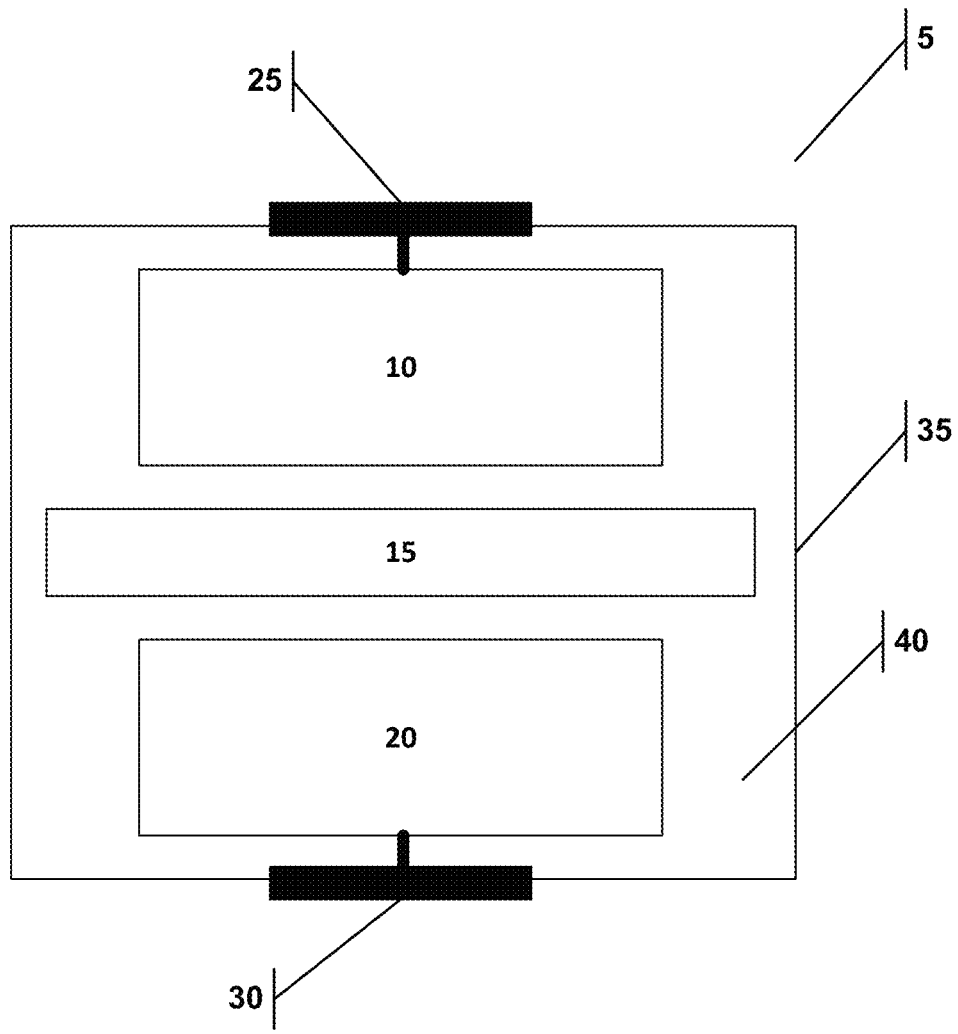
FIG. 6 is a schematic showing the electrochemical device assembly with an integrated electrolyte.

The aforementioned liquefied gas electrolytes may be used in an electrochemical device. FIG. 6 schematically illustrates an electrochemical device 5 with an electrode stack consisting of a positive electrode 10, a negative electrode 20, and an ionically conducting, but electrically isolating, separator membrane 15. The stack is immersed in an electrolyte mixture 40. The electrode stack and the electrolyte 40 are also housed inside a battery cell housing 35, with a positive terminal 25 and negative terminal 30 accessible from the outside of the housing 35. The battery cell housing 35 is structured such that it can maintain a pressure required to ensure the liquefied gas electrolyte is maintained under pressure and in a liquid phase While this document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. An ionically conducting electrolyte comprising:
a salt; and
a liquefied gas solvent mixture having a vapor pressure above 100 kPa at a temperature of 293.15 K, comprised of a first solvent component and a second solvent component, wherein the first solvent component is selected from the group consisting of: hydrochloroolefins, hydrochlorofluoroolefins, perchloroolefins, and perfluoroolefins.

2. The ionically conducting electrolyte of claim 1, wherein the relative amounts of the first solvent component and the second solvent component are selected to reduce the Global Warming Potential (GWP) of the liquefied gas solvent mixture by less than 10% of the GWP of the second solvent component alone.

3. The ionically conducting electrolyte of claim 1, wherein the relative amounts of the first solvent component and the second solvent component are selected to reduce the Global Warming Potential (GWP) of the liquefied gas solvent mixture by less than 50% of the GWP of the second solvent component alone.

4. The ionically conducting electrolyte of claim 1, wherein the relative amounts of the first solvent component and the second solvent component are selected to reduce the Global Warming Potential (GWP) of the liquefied gas solvent mixture by less than 70% of the GWP of the second solvent component alone.

5. The ionically conducting electrolyte of claim 1, wherein the first solvent component has a Global Warming Potential (GWP) of less than 10.

6. The ionically conducting electrolyte of claim 5, wherein the second solvent component has a GWP of greater than 80.

7. The ionically conducting electrolyte of claim 1, wherein the first solvent component is selected from the group consisting of: 1,1-dichloroethene, vinyl chloride, trichloroethene, dichloroethene, chlorofluoroethene, (Z)-1-chloro-2,3,3,3,-tetrafluoro-propene, trans-1-chloro-3,3,3-trifluoropropene and isomers thereof.

8. The ionically conducting electrolyte of claim 1, wherein the second solvent component is selected from the group consisting of: dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, isomers thereof, and a combination thereof.

9. The ionically conducting electrolyte of claim 1, wherein the salt is based on lithium, sodium, zinc, calcium, magnesium, aluminum, or titanium.

10. An electrochemical device comprising the electrolyte of claim 1.

11. The electrochemical device of claim 10, further comprising:
- a housing enclosing the ionically conducting electrolyte; and
- an anode, a cathode, and a separator layer in contact with the ionically conducting electrolyte.

\* \* \* \* \*